United States Patent
Onishi et al.

(10) Patent No.: US 7,330,317 B2
(45) Date of Patent: Feb. 12, 2008

(54) LENS SYSTEM AND IMAGE CAPTURING APPARATUS

(75) Inventors: Hideo Onishi, Sakai (JP); Shuichi Fujii, Matsubara (JP); Norio Maeda, Toyokawa (JP); Tetsuya Uno, Tondabayashi (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 60 days.

(21) Appl. No.: 11/148,634

(22) Filed: Jun. 9, 2005

(65) Prior Publication Data

US 2006/0001982 A1 Jan. 5, 2006

(30) Foreign Application Priority Data

Jun. 30, 2004 (JP) ............................. 2004-192967
Aug. 4, 2004 (JP) ............................. 2004-228239

(51) Int. Cl.
*G02B 15/14* (2006.01)
(52) U.S. Cl. ....................... 359/697; 359/694; 359/700
(58) Field of Classification Search ................ 359/694, 359/697–704, 819, 822, 823
See application file for complete search history.

(56) References Cited

U.S. PATENT DOCUMENTS

| 5,768,038 | A | * | 6/1998 | Emura | ..................... 359/824 |
| 6,031,663 | A | * | 2/2000 | Funatsu | ..................... 359/407 |
| 6,046,865 | A | * | 4/2000 | Ihara | ..................... 359/819 |
| 6,954,313 | B2 | * | 10/2005 | Kaneda et al. | ............. 359/696 |

FOREIGN PATENT DOCUMENTS

| JP | 2000-066263 | 3/2000 |
| JP | 2003-307661 | 10/2003 |

OTHER PUBLICATIONS

"Notice of Reasons for Rejection," (Office Action) for Japanese Patent Application No. 2004-228239, issued Jul. 3, 2006, 7 pages.

\* cited by examiner

*Primary Examiner*—M. Hasan
(74) *Attorney, Agent, or Firm*—Brinks Hofer Gilson & Lione

(57) ABSTRACT

A lens system 3 is provided with a plurality of lens units including a first lens unit 9, and has a condition changing structure 6 that is capable of changing the condition of the first lens unit 9 without changing the position of the first lens unit 9 in the direction of the optical axis x.

18 Claims, 12 Drawing Sheets

LENS SYSTEM AND IMAGE CAPTURING APPARATUS

This application is based on applications Nos. 2004-192967 and 2004-228239 filed in Japan, the content of which is hereby incorporated by reference.

The present invention relates to a lens system and an image capturing apparatus.

DESCRIPTION OF THE RELATED ART

In a lens system used for an image capturing apparatus and the like, it is important that the optical elements such as lens elements be held in the designed positional relationship with one another.

In conventional lens systems, because of decentering, such as inclination decentering in which the axis of an optical element is inclined or parallel decentering in which the axis of a lens element is shifted in a direction perpendicular to the axis, or an error in a lens-to-lens distance due particularly to a manufacturing error of a holding member such as a lens barrel or a lens holder that holds lens elements, the positional relationship among the optical elements becomes inappropriate, so that there are cases where a sharp formed image cannot be obtained.

Decentering is apt to occur, particularly, in a collapsible structure in which a forward barrel to which the objective lens is fixed is protruded to a predetermined position only when the lens system is used and a structure having a variator lens unit with a large movement amount.

When parts are highly precisely manufactured to eliminate the lens decentering and the lens-to-lens distance error, the time required for designing and manufacturing is prolonged and cost is increased.

Moreover, although centering adjustment is performed during manufacturing procedure in which a predetermined image is formed by the lens system and the fixed positions and the directions of the lens elements are adjusted so that the sharpest image is formed, such centering adjustment also increases the cost of the lens system. A structure is also known in which the lens elements are held by an elastic member to facilitate the centering adjustment of the lens elements; however, the centering adjustment of the lens elements is still a significant factor that increases the cost.

Moreover, in such centering adjustment, since a sharp formed image is obtained as the entire lens system by the decenterings of a plurality of lens elements canceling one another out, even though centering adjustment is performed with one focal length, a sharp image cannot be obtained when the relative decentering relationship among the lens elements is changed by zooming or focus movement.

SUMMARY OF THE INVENTION

An object of the present invention is to provide a lens system and an image capturing apparatus that are inexpensive and with which a sharp formed image is obtained.

To attain the above-mentioned object, a first aspect of the present invention provides a lens system that is provided with a plurality of lens units including a first lens unit and has a condition changing structure capable of changing the condition of the first lens unit without changing the position of the first lens unit in the direction of the optical axis.

Moreover, another aspect of the present invention provides a lens system provided with a plurality of lens units including a first lens unit. In the lens system, a condition changing structure that is capable of changing the condition of the first lens unit is provided, the optimum condition of the first lens unit under which the sharpest formed image is obtained is determined after assembly, and the first lens unit is set in the optimum condition by the condition changing structure when the lens system is used.

Moreover, yet another aspect of the present invention provides a lens system that is provided with a plurality of lens units including a predetermined lens unit and has a condition changing structure capable of changing the condition of the predetermined lens unit without changing the position of the predetermined lens unit in the direction of the optical axis. It is favorable that a lens unit that is collapsed when the lens system is not used and is moved out when the lens system is used is selected as the predetermined lens unit. Moreover, while it is favorable that a lens unit that is not moved for zooming or focusing is selected as the predetermined lens unit, a lens unit that is moved may be selected.

Moreover, still another aspect of the present invention provides an image capturing apparatus having a lens system provided with these structures.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Hereinafter, embodiments of the present invention will be described with reference to the drawings.

Figure 1:
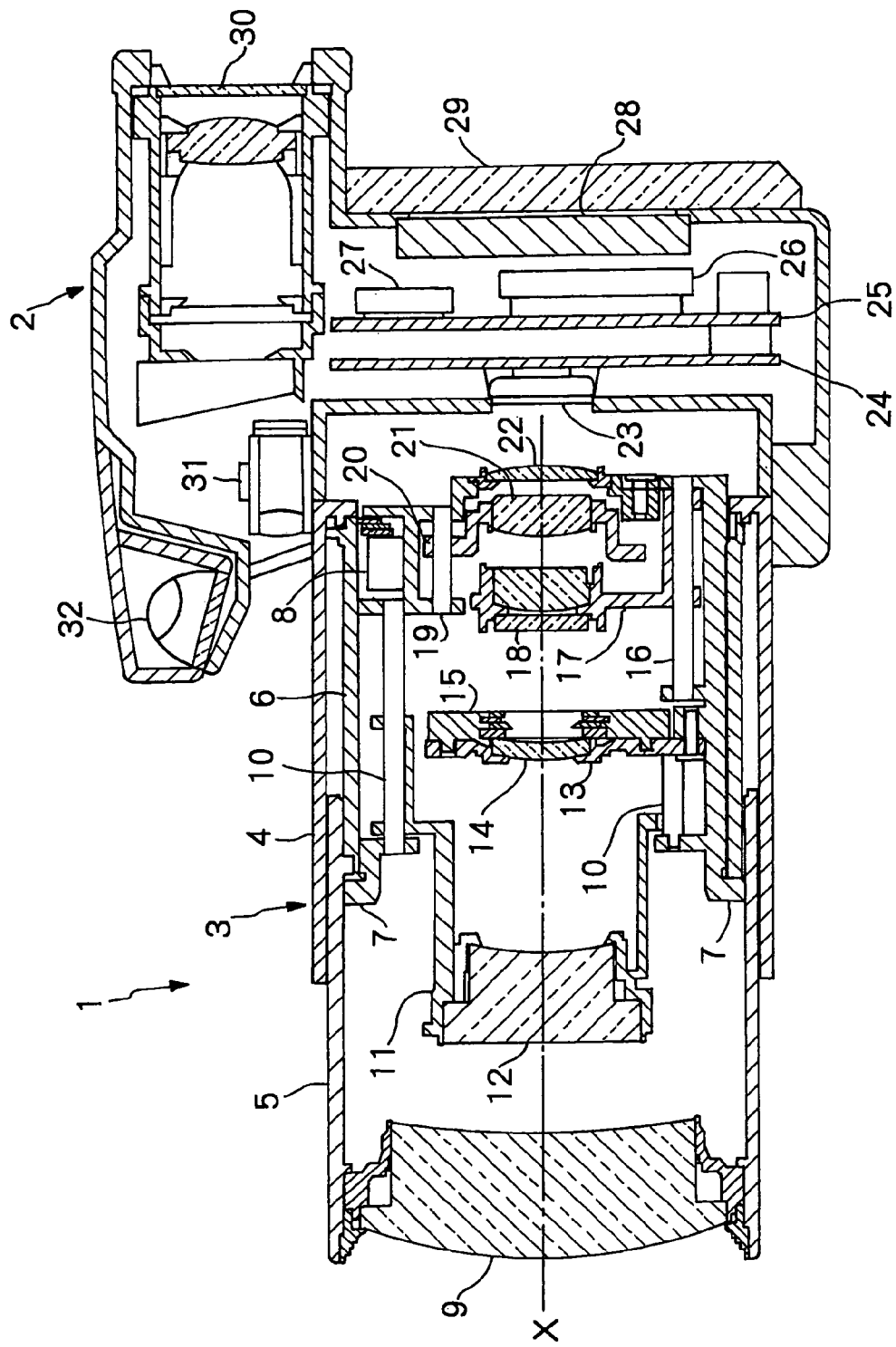
FIG. 1 is a cross-sectional view of a digital camera that is an image capturing apparatus according to a first embodiment of the present invention.

An image capturing apparatus 1 shown in FIG. 1 is a digital camera, and is provided with a body 2 and a lens system 3 attached to the front of the body 2.

The lens system 3 has: an outside fixed barrel 4 serving as the outer barrel; a forward barrel 5 that is collapsed so as to be housed inside the outside fixed barrel 4 and is capable of protruding forward as shown in the figure when the lens system 3 is used; and a cam ring 6 that rotates inside the forward barrel 5 to thereby move the forward barrel 5 backward and forward. Moreover, the lens system 3 is provided with an inside fixed barrel 7 that holds the forward barrel 5 and the cam ring 6 from inside.

The cam ring 6, which is rotated by a motor 8 provided in the inside fixed barrel 7, moves the forward barrel 5 backward and forward by the rotation.

In the lens system 3, the following lens units are set in the following order from the front: First, a first lens unit 9 is set at the front end of the forward barrel 5, and a second lens unit 12 is set in a second unit holder 11 that is slidably engaged with a suspending shaft 10 provided in the inside fixed barrel 7. A light interceptor 15 comprising a third lens unit 14, a shutter and an aperture diaphragm that are integrated with one another is set in a third unit holder 13 fixed to the inside fixed barrel 7. A fourth lens unit 18 is set in a fourth unit barrel 17 that is slidably engaged with a suspending shaft 16 further provided in the inside fixed barrel 7.

Moreover, a fifth lens unit 21 is set in a fifth unit holder 20 that is slidably engaged with a suspending shaft 19 provided in the inside fixed barrel 7. Further, a sixth lens unit 22 is provided at the rear end of the inside fixed barrel 7. In design, the optical axis x of the lens system 3 shown by the alternate long and short dash line and the axes of all of the lens units 9, 12, 14, 18, 21 and 22 coincide with one another.

Then, the incident light from the subject is, through the lens system 3, formed into an image on an image sensor 23 comprising a CCD provided inside the body 2, and is converted into an electric signal. The image sensor 23 is provided on a substrate 24, and a control circuit including a CPU 26 serving as controller and a memory 27 serving as storage is provided on the substrate 24 and a substrate 25 coupled to the substrate 24.

Further, a display 28 by means of liquid crystal display and a transparent member 29 protecting the display 28 are provided in a rear part of the body 2. Further, a finder 30 for confirming the captured image, a distance measuring unit 31 that measures the distance from the subject and an electronic flash device 32 for projecting illumination light to the subject are provided in the body 2.

Figure 2:
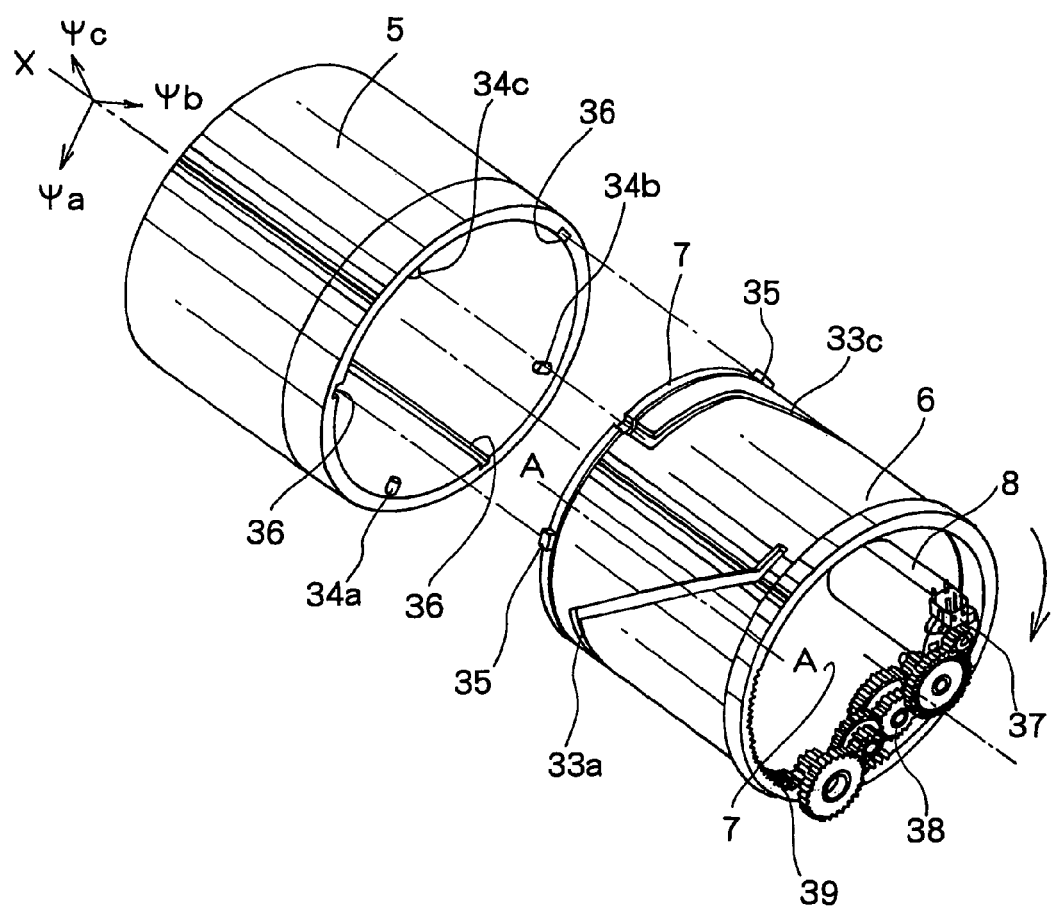
FIG. 2 is a partial exploded perspective view of the image capturing apparatus of FIG. 1.

With reference to FIG. 2, details of the forward barrel 5, the cam ring 6 and the inside fixed barrel 7 will be described. The left side of the figure is the front side, that is, the subject side.

On the outer surface of the cam ring 6, three cam grooves 33a, 33b and 33c are provided at intervals of 120 degrees in the circumferential direction, and accept three cam followers 34a, 34b and 34c provided at intervals of 120 degrees in a circumferential direction inside the forward barrel 5. The cam groove 33b, which is situated on the back side of FIG. 2, does not appear in the figure. Three protrusions 35 are provided outside the front end of the inside fixed barrel 7. The protrusions 35 are engaged with three rectilinear grooves 36 provided so as to extend in the direction of the optical axis inside the forward barrel 5, respectively.

A rotary encoder 37 is provided on an output shaft of the motor 8 fixed to the inside of the inside fixed barrel 7. The motor 8 is engaged, through a gear train 38, with an internal gear 39 provided inside the rear end of the cam ring 6.

Figure 3:
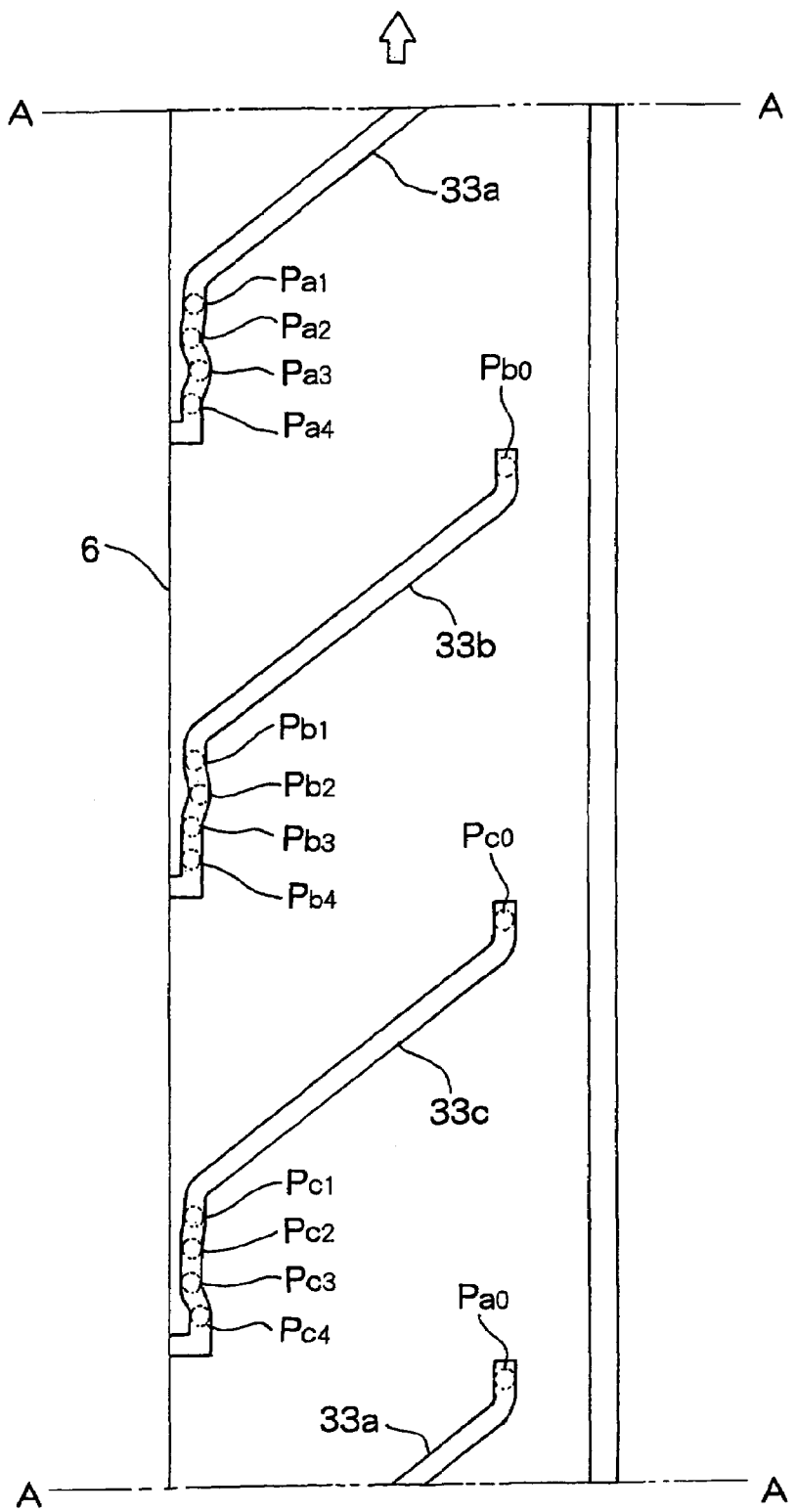
FIG. 3 is a developed view of a cam ring of FIG. 2.

FIG. 3 is a developed view of the cam ring 6 cut along the line A-A of FIG. 2.

The cam grooves 33a, 33b and 33c are each provided with a moving out portion that obliquely extends to move the forward barrel 5 backward and forward with respect to the outside fixed barrel 4, a housing portion that extends in a direction vertical to the optical axis x at one end (rear end) of the moving out portion, and a use portion that extends in a direction substantially vertical to the optical axis x at the other end (front end) of the moving out portion.

The housing portion is provided in each of the cam grooves 33a, 33b and 33c, and when the forward barrel 5 is moved backward to be housed in the outside fixed barrel 4, the cam followers 34a, 34b and 34c are stopped at housed positions Pa0, Pb0 and Pc0 in the housing portions, respectively, as shown by the chain double-dashed lines.

The use portion is also provided in each of the cam grooves 33a, 33b and 33c, and when the forward barrel 5 is moved forward to protrude out of the outside fixed barrel 4, the cam followers 34a, 34b and 34c are situated in the use portions, respectively.

The configurations of the use portions will be described in detail. In the use portions, four selectable use positions Pa1 to Pa4, Pb1 to Pb4 and Pc1 to Pc4 are set for the cam followers, respectively. Among the cam grooves 33a, 33b and 33c, although the configurations of the moving out portions and the housing portions are all the same, the configurations of the grooves of the use portions are slightly different from one another.

The housed positions Pa0, Pb0 and Pc0 and the use positions Pa1, Pb1 and Pc1 are provided on the cam ring 6 at regular intervals of 120 degrees with respect to the optical axis x in the same positions with respect to the direction of the optical axis x. On the contrary, the cam grooves 33a, 33b and 33c are curved so that the use positions Pa2, Pb2 and Pc2, the use positions Pa3, Pb3 and Pc3 and the use positions Pa4, Pb4 and Pc4 are different in position in the direction of the optical axis x although they are at regular intervals of 120 degrees with respect to the optical axis x.

Figure 4:
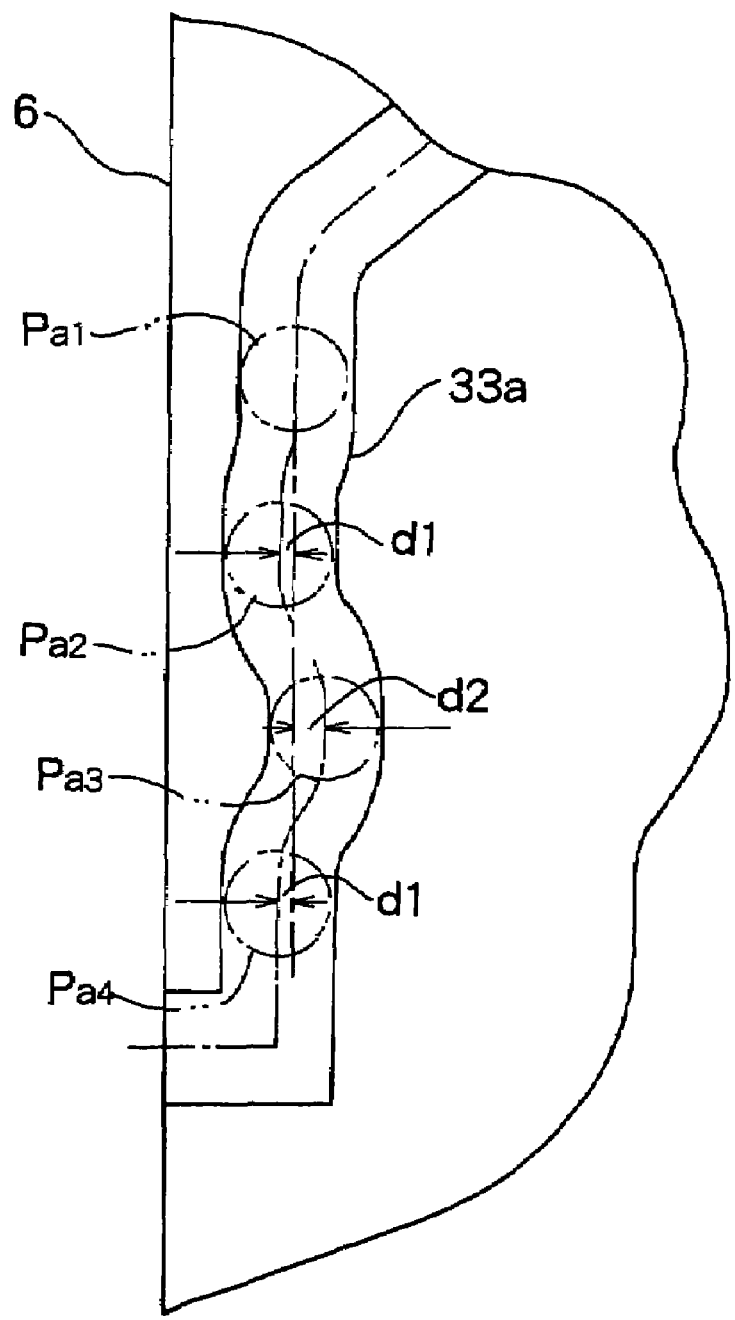
FIG. 4 is a partial enlarged view of a cam groove.

FIG. 4 is an enlarged view of the front end of the cam groove 33a. The use position Pa2 and the use position Pa4 are a distance d1 forward of the use position Pa1, and the use position Pa3 is a distance d2 behind the use position Pa1. Although no enlarged view is shown, in the cam groove 33b, the use position Pb3 and the use position Pb4 are the distance d1 forward of the use position Pb1, and the use position Pb2 is the distance d2 behind the use position Pb1. Likewise, in the cam groove 33c, the use position Pc2 and the use position Pc3 are the distance d1 forward of the use position Pc1, and the use position Pb4 is the distance d2 behind the use position Pc1.

The operation of the image capturing apparatus 1 having the above-described structure will be described.

In the lens system 3 of the image capturing apparatus 1, when the lens system 3 is not used, the cam followers 34a, 34b and 34c of the forward barrel 5 are situated in the housed positions Pa0, Pb0 and Pc0 of the cam grooves 33a, 33b and 33c of the cam ring 6, respectively, and the forward barrel 5 is moved backward to be housed inside the outside fixed barrel 4. Naturally, the second lens unit 12 is also moved backward from the position shown in FIG. 1 by a non-illustrated driving mechanism to be situated in a position not interfering with the first lens unit 9.

In the image capturing apparatus 1, when the power switch which is not shown is turned on, the cam ring 6 is rotated around the optical axis x in the direction of the arrow of FIG. 2 by the motor 8. The forward barrel 5 cannot rotate around the optical axis x although it can move backward and forward, because the rectilinear grooves 36 are engaged with the protrusions 35 of the inside fixed barrel 7. For this reason, the forward barrel 5 is pushed forward in the direction of the optical axis x by the cam followers 34a, 34b and 34c moving by being lead by the cam grooves 33a, 33b and 33c of the cam ring 6.

Figure 5:
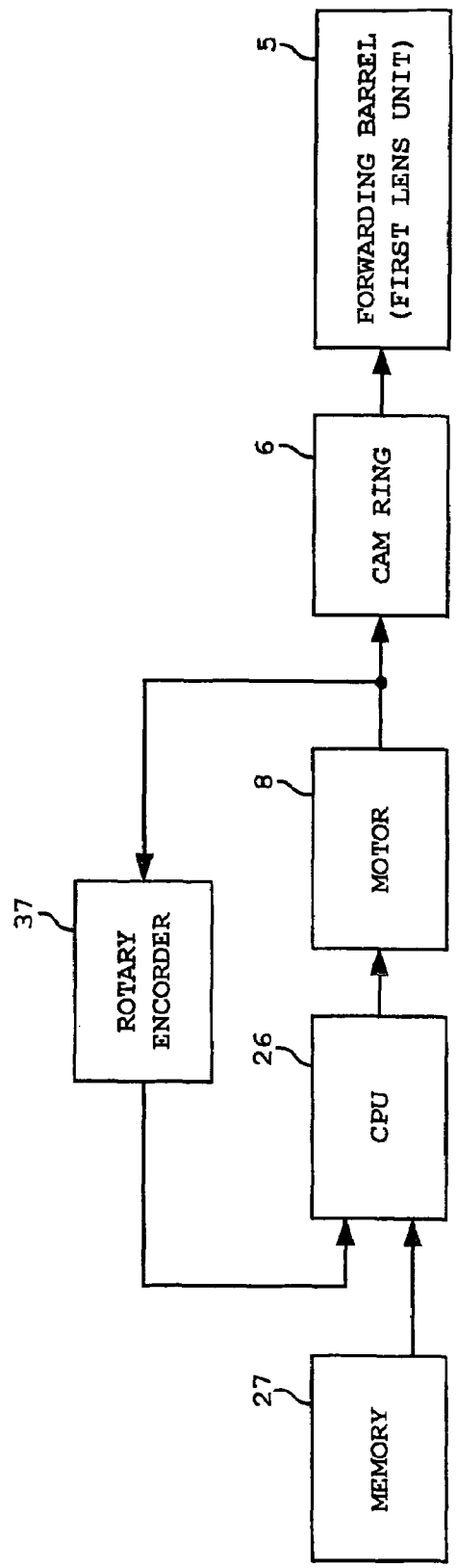
FIG. 5 is a block diagram showing the positioning control of the first lens unit of the image capturing apparatus of FIG. 1.

Referring to the block diagram of FIG. 5, the flow of the positioning of the forward barrel 5 having the first lens unit and the control thereof will be described. As the rotation angle of the motor 8, the pulse of the rotary encoder 37 is integrated by the CPU 26 with a given reference, for example, the rotation end of the cam ring 6 as the origin (zero point).

The rotation angle of the cam ring 6 is determined in proportion to the rotation angle of the output shaft of the motor 8, and in which of the use positions Pa1, Pb1 and Pc1, the use positions Pa2, Pb2 and Pc2, the use positions Pa3, Pb3 and Pc3 and the use positions Pa4, Pb4 and Pc4 on the cam grooves 33a, 33b and 34c, the cam followers 34a, 34b and 34c are stopped is determined according to the rotation angle of the cam ring 6, whereby the position of the forward barrel 5 is determined and the fixation condition of the first lens unit 9 is determined.

The rotation angle of the motor 8 that produces the rotation angle of the cam ring 6 corresponding to any of the use positions Pa1 to Pa4, Pb1 to Pb4 and Pc1 to Pc4 is stored in the memory 27 as the number of output pulses of the rotary encoder 37 at the time of shipment. When the image capturing apparatus 1 is used, the fixation condition of the first lens unit 9 determined by rotating the cam ring 6 to a predetermined angle by rotating the motor 8 until the pulses of the number stored in the memory 27 are outputted is selected and used.

Moreover, the second lens unit 12 and the fourth lens unit 18 are moved to predetermined positions along the direction of the optical axis x by a non-illustrated second driving mechanism and the fifth lens unit 21 is moved to a predetermined position along the direction of the optical axis x by a non-illustrated third driving mechanism, whereby the incident light from the subject is formed into an image on the image sensor 23 to enable image capturing.

Further, zooming can be performed by moving the second lens unit 12 and the fourth lens unit 18 in the direction of the optical axis x, and focusing can be performed by moving the fifth lens unit 21 in the direction of the optical axis x while the motor 8 is stopped so that the first lens unit 9 is fixed, thereby photographing with desired magnification under in-focus condition can be performed.

When the power switch of the image capturing apparatus 1 is turned off, contrary to when the power switch is turned on, the fifth lens unit 21 is moved toward the image sensor 23 along the optical axis x by the third driving mechanism, the second lens unit 12 and the fourth lens unit 18 are moved toward the image sensor 23 along the direction of the optical axis x by the second driving mechanism, the cam ring 6 is rotated in reverse by rotating the motor 8 in reverse by the rotation angle represented by the number of pulses of the rotary encoder 37 stored in the memory 27, and the cam followers 34a, 34b and 34c of the forward barrel 5 are returned to the housed positions Pa0, Pb0 and Pc0, respectively, to house the forward barrel 5 in the outside fixed barrel 4.

Next, it will be described in what conditions the first lens unit is fixed when the cam followers 34a, 34b and 34c are situated in the use positions Pa1, Pb1 and Pc1, in the use positions Pa2, Pb2 and Pc2, in the use positions Pa3, Pb3 and Pc3 and in the use positions Pa4, Pb4 and Pc4. First, when the cam followers 34a, 34b and 34c are situated in the use positions Pa1, Pb1 and Pc1, respectively, in design, the axis of the first lens unit 9 coincides with the optical axis x of the lens system 3.

Figure 6:
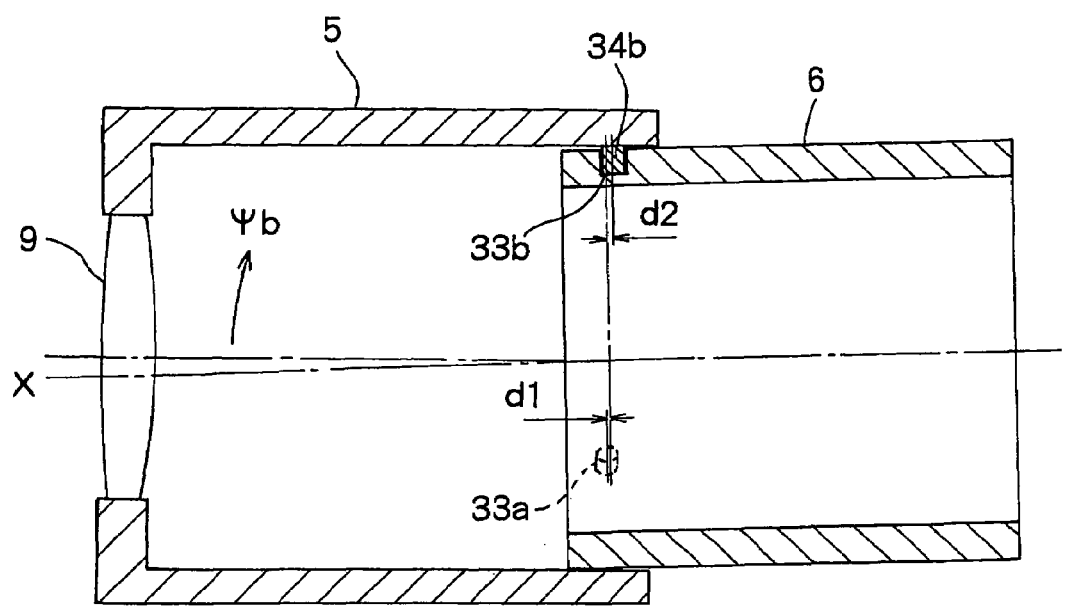
FIG. 6 is a cross-sectional view showing the condition of fixing of the forward barrel of FIG. 2 to the cam ring.

FIG. 6 shows a cross section of the forward barrel 5 and the cam ring 6 taken on a plane including the optical axis x and the cam follower 34b when the cam followers 34a, 34b and 34c are situated in the use positions Pa2, Pb2 and Pc2, respectively.

In design, the cam follower 34b is situated the distance d2 behind the use positions Pa1, Pb1 and Pc1 in the direction of the optical axis x, and the cam follower 34a and the cam follower 34c (not appearing in the figure) are situated the distance d1 forward of the use positions Pa1, Pb1 and Pc1 in the direction of the optical axis x. This inclines the axis of the forward barrel 5 in the ψb direction when viewed from the body 2. Likewise, when the cam followers 34a, 34b and 34c are situated in the use positions Pa3, Pb3 and Pc3, respectively, in design, the forward barrel 5 is inclined in the ψa direction in FIG. 2, and when the cam followers 34a, 34b and 34c are situated in the use positions Pa4, Pb4 and Pc4, respectively, in design, the forward barrel 5 is inclined in the ψc direction.

The ratio between the distance d1 and the distance d2 are approximately 1:2. This ratio is selected in order to prevent the central points of the cam followers 34a, 34b and 34c from moving backward and forward in the direction of the optical axis x so that the distances from the first lens unit 9 to the other lens units 12, 14, 18, 21 and 22 do not change even when the forward barrel 5 is inclined.

In design, when the cam followers 34a, 34b and 34c are situated in the use positions Pa1, Pb1 and Pc1, respectively, the axis of the first lens unit 9 coincides with the optical axis x of the lens system 3. In actuality, however, quite a few image capturing apparatuses 1 have an inclination decentering in which the axis of the first lens unit 9 is inclined due particularly to manufacturing errors of the forward barrel 5 and the cam ring 6. Moreover, there are cases where the other lens units 12, 14, 18, 21 and 22 also have the inclination decentering.

For this reason, prior to shipment, light from a predetermined reference image is made incident on the lens system 3 of each image capturing apparatus 1, it is examined which of the fixation conditions of the first lens unit when the cam followers 34a, 34b and 34c are situated in the use positions Pa1, Pb1 and Pc1, in the use positions Pa2, Pb2 and Pc2, in the use positions Pa3, Pb3 and Pc3 and in the use positions Pa4, Pb4 and Pc4 produces the sharpest image on the image sensor 23, and the number of pulses of the rotary encoder 37 representative of the rotation angle of the motor 8 necessary for obtaining the fixation condition is stored in the memory 27.

Thus, the image capturing apparatus 1 is inexpensive because the image capturing apparatus 1, which is shipped under a condition where the lens condition under which the sharpest image is formed is stored in the memory 27, is formed of parts of normal dimensional precision and can be assembled by a normal assembly method although the incident light from the subject is formed into a sharp image on the image sensor 23 and the captured image is sharp.

While the examination, described above, of the lens condition under which the sharpest image is formed for storing the lens condition in the memory 27 may be performed on each individual lens system 3, the following may be performed: With the lens systems 3 or the like containing parts having the same production lot or manufactured with the same mold as the population, the examination is performed only on a representative sample extracted from the population and the optimum condition obtained by the examination is stored in the memory 27 of each of the lens systems 3 belonging to the population.

Moreover, in the image capturing apparatus 1, when the positions of the second lens unit 12 and the fourth lens unit 18 are changed for changing magnification or the position of the fifth lens unit 21 is changed for changing the focus position, the influence of the decentering of the first lens unit 9 on the image formed on the image sensor 23 is changed.

For this reason, the following may be performed: Information for identifying the positions of the second lens unit 12 and the fourth lens unit 18 or the position of the fifth lens unit 21 and the number of output pulses of the rotary encoder 37 for identifying the condition of the first lens unit 9 are stored in the memory 27, and the fixation condition is changed according to the zoom position or the focus position so that the sharpest image is obtained on the image sensor 23.

In this case, although the operation performed for photographing is enabled is the same as that described above, after zooming is performed for changing magnification by moving the second lens unit 12 and the fourth lens unit 18 in the direction of the optical axis x, the condition of the first lens unit 9 is changed by the motor 8 so that the sharpest image is obtained on the image sensor 23 according to the positions of the second lens unit 12 and the fourth lens unit 18, and then, an image is captured1 by the image sensor 23.

Next, the image capturing apparatus 1 of a second embodiment will be described. Descriptions of elements the same as those of the first embodiment are omitted, and only different parts will be described.

Figure 7:
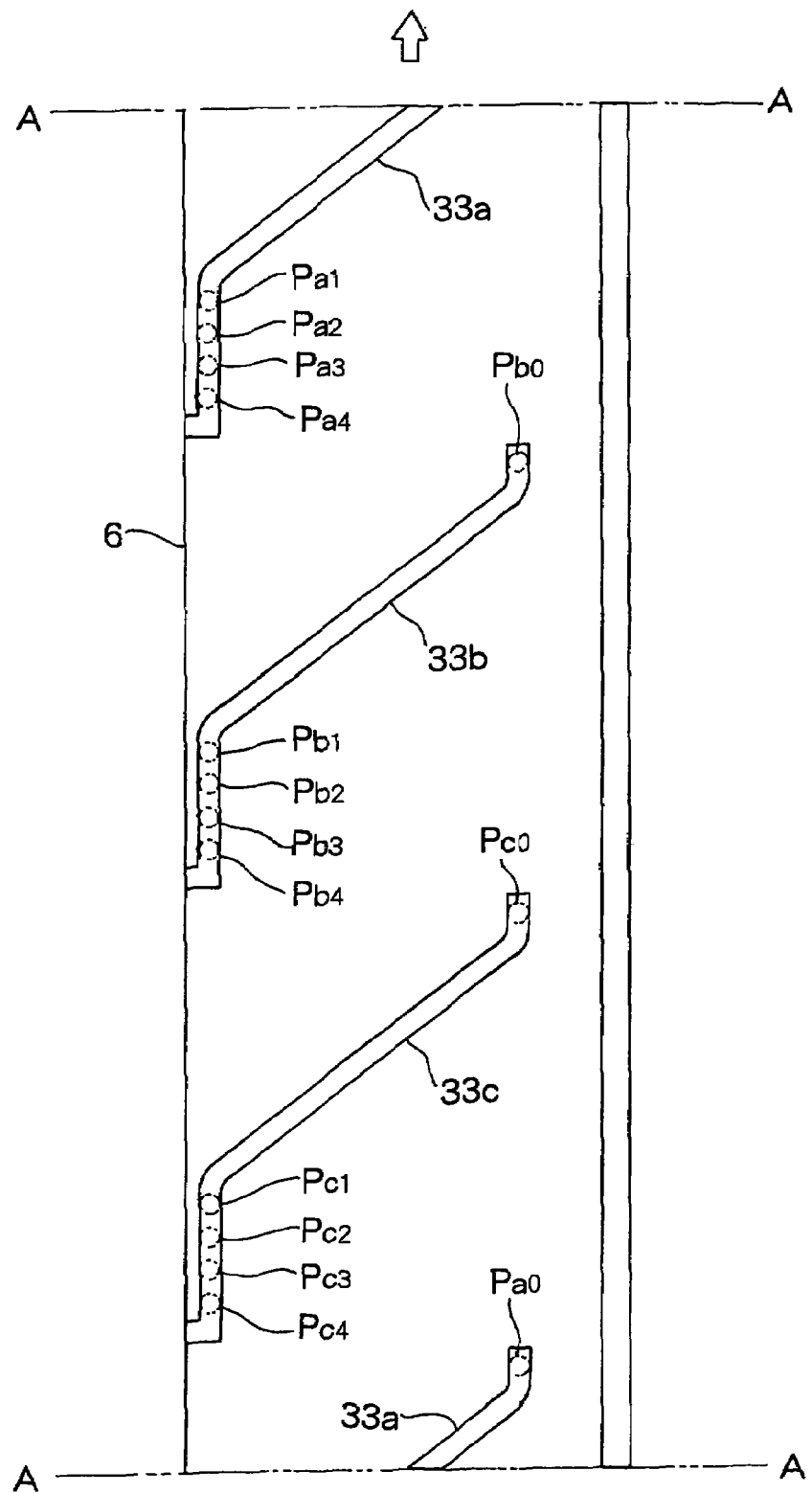
FIG. 7 is a developed view of the cam ring in a second embodiment of the present invention.

As shown in FIG. 7, in the cam ring 6 of the lens system 3 of the image capturing apparatus 1 of the second embodiment, the configuration of the front ends of the cam grooves 33a, 33b and 33c, that is, the use portions is different from that of the first embodiment, and the use positions Pa1 to Pa4, Pb1 to Pb4 and Pc1 to Pc4 in which the cam followers 34a, 34b and 34c of the forward barrel 5 are stopped are arranged in a straight line vertically to the direction of the optical axis x.

Figure 8:
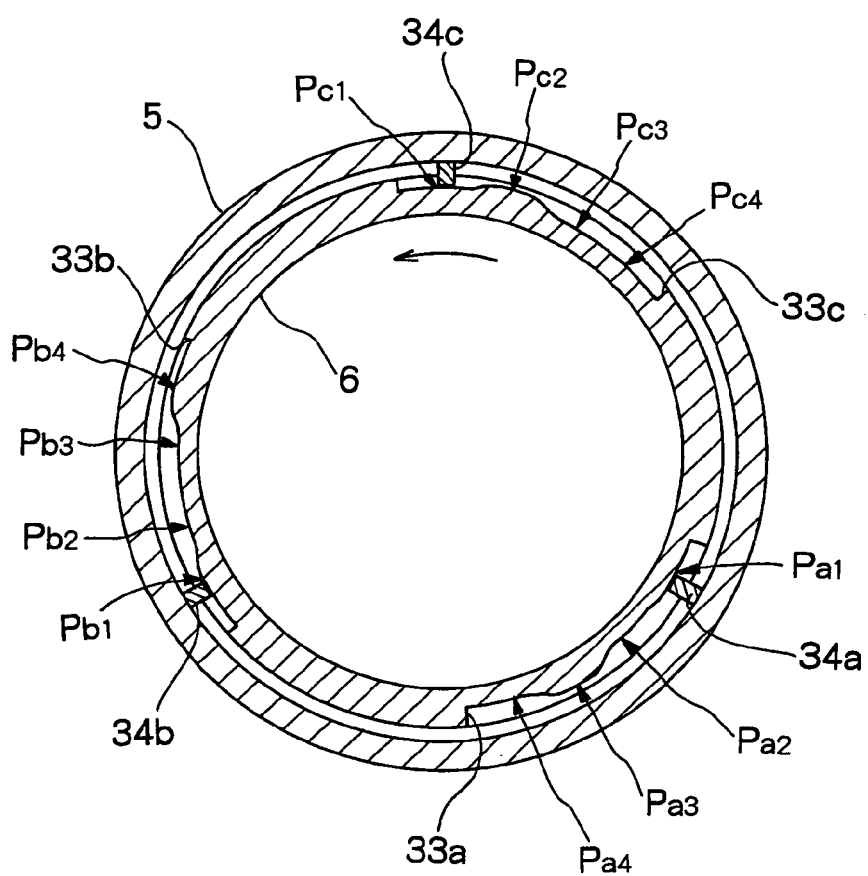
FIG. 8 is a cross-sectional view of a lens system according to the second embodiment of the present invention.

However, as shown in the cross-sectional view of FIG. 8, the front ends of the cam grooves 33a, 33b and 33c vary in depth among the use positions. Describing in detail, the depths of the cam grooves 33a, 33b and 33c in the use positions Pa1, Pb1 and Pc1 are all the same, and in the cam groove 33a, the depths in the use position Pa2 and in the use position Pa4 are larger than that in the use position Pa1, and the depth in the use position Pa3 is smaller than that in the use position Pa1. Likewise, in the cam groove 33b, the depths in the use position Pb2 and the use position Pb3 are large and the depth in the use position Pb4 is small, and in the cam groove 33c, the depth is small in the use position Pc2 and large in the use position Pb3 and in the use position Pb4.

Figure 9:
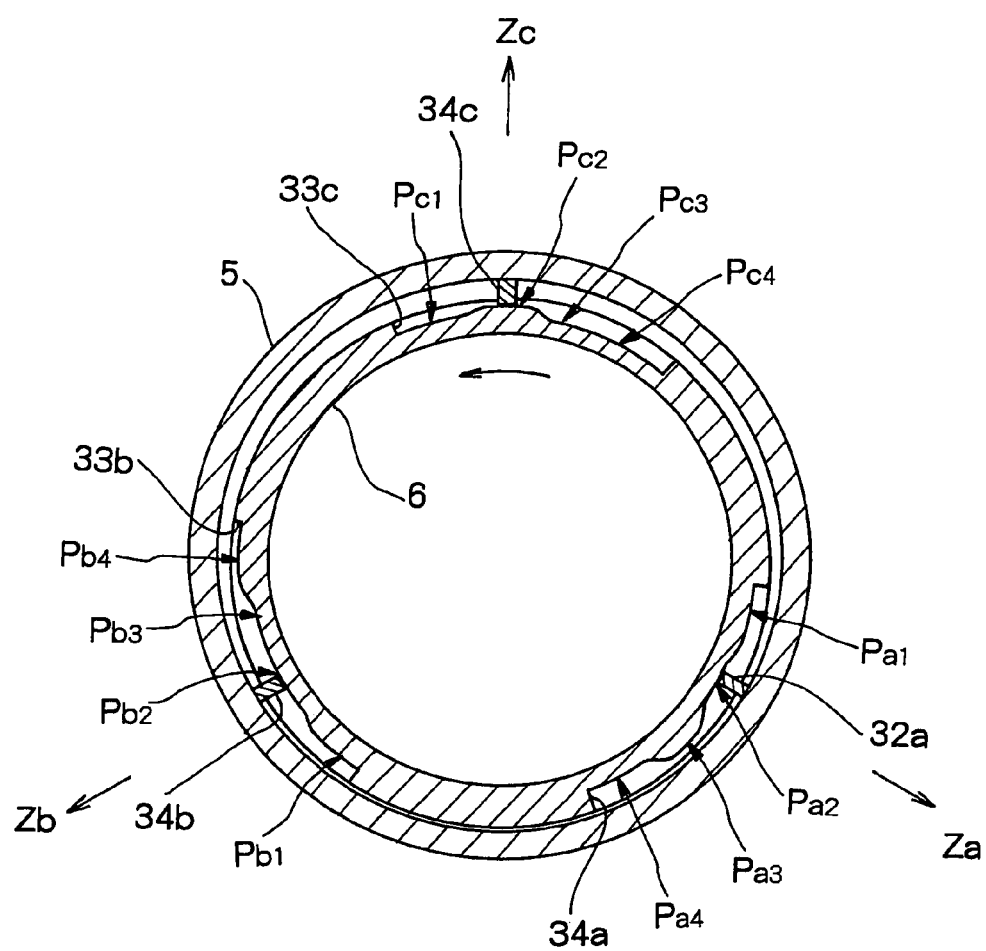
FIG. 9 is a cross-sectional view showing a different fixation condition of the lens system of FIG. 8.

The operation of the lens system 3 of the second embodiment-having the above-described structure will be described with reference to FIG. 9. FIG. 9 shows a condition in which the cam ring 6 is further slightly rotated from a condition where the cam followers 34a, 34b and 34c are stopped in the use positions Pa1, Pb1 and Pc1 like in FIG. 8 to a condition where the cam followers 34a, 34b and 34c are engaged in the use positions Pa2, Pb2 and Pc2.

As shown in FIG. 9, when the cam followers 34a, 34b and 34c are engaged with the use positions Pa2, Pb2 and Pc2, since the cam groove 33c is shallow and the cam grooves 33a and 33b are deep, the forward barrel 5 is pushed up in the direction of the cam follower 34c (the Zc direction in the figure) to be parallel decentered vertically to the optical axis x in the Zc direction with the axis remaining vertical to the plane of the figure.

Moreover, when the cam ring 6 is further rotated in the direction of the arrow and the cam followers 34a, 34b and 34c are engaged in the use positions Pa3, Pb3 and Pc3, the forward barrel 5 is parallel decentered vertically to the optical axis x in the Za direction, and when the cam ring 6 is further rotated and the cam followers 34a, 34b and 34c are engaged in the use positions Pa4, Pb4 and Pc4, the forward barrel 5 is parallel decentered vertically to the optical axis x in the Zb direction.

As described above, in the second embodiment, in design, the axis of the first lens unit 9 held by the forward barrel 5 can take the following four fixation conditions according to the rotation stop position of the cam ring 6: a fixation condition where the axis coincides with the optical axis x; and fixation conditions where the axis is parallel decentered in the three directions Za, Zb and Zc, respectively. Then, prior to shipment, it is examined which of the fixation conditions produces the sharpest image on the image sensor 23, and the number of output pulses of the rotary encoder 37 with which the optimum fixation condition is obtained is stored in the memory 27.

As described above, the image capturing apparatus 1 is shipped after programmed so that the fixation condition under which the disturbance of the formed image due to the parallel decentering is smallest is selected when the image capturing apparatus 1 is used, so that the incident light from the subject is sharply formed into an image on the image sensor 23 and the captured image is sharp.

While in each of the first embodiment and the second embodiment, the four fixation conditions among which the inclination decentering or the parallel decentering is different are provided, by finely controlling the movement amount of the cam ring 6, a larger number of fixation conditions can be set, and by combining the first embodiment and the second embodiment, a fixation condition that is optimum for both of the two kinds of decenterings, the inclination decentering and the parallel decentering, can be selected.

Figure 10:
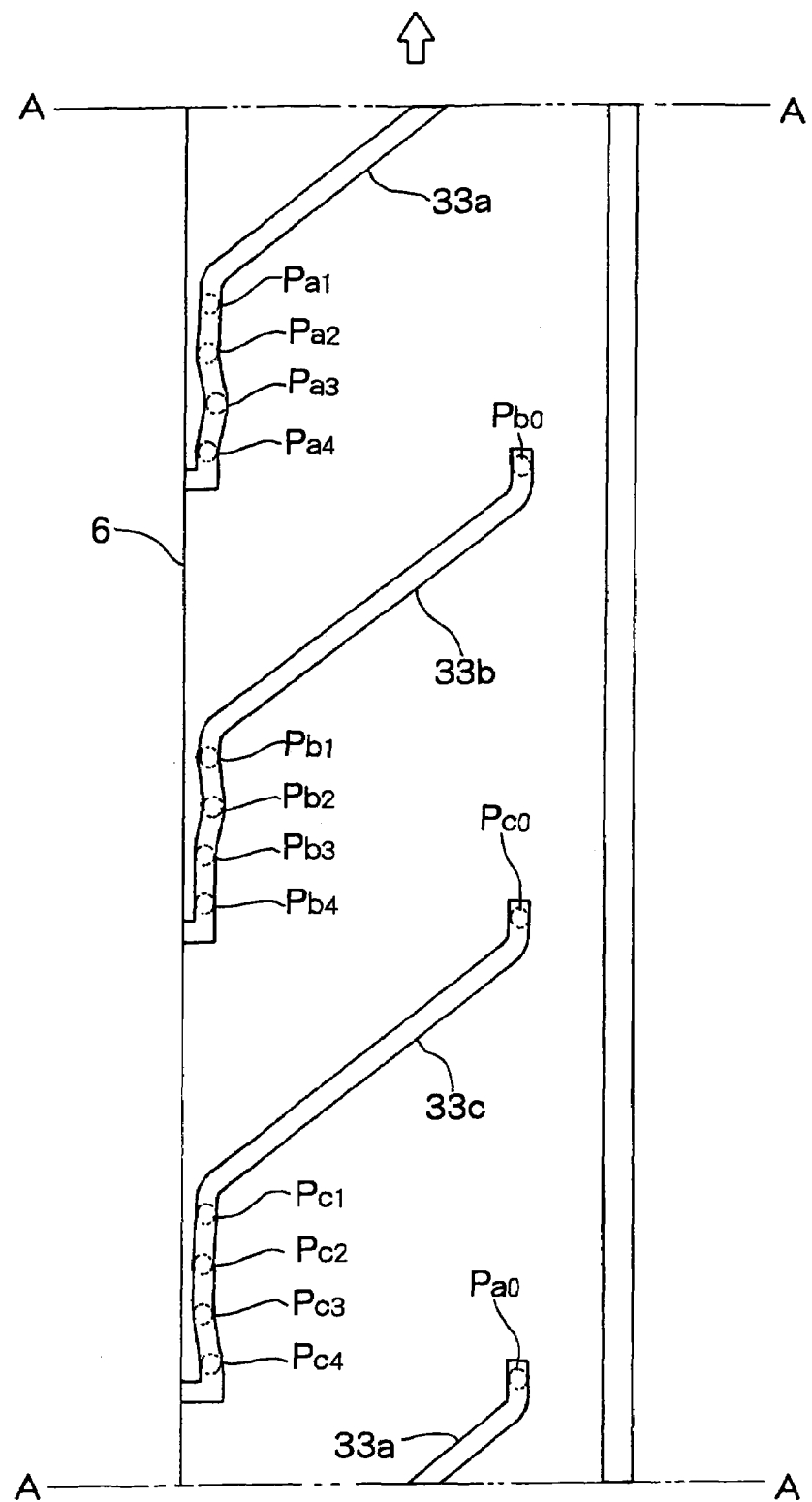
FIG. 10 is a developed view of the cam ring in a third embodiment of the present invention.

As a third example, FIG. 10 shows a developed view of the cam ring 6 of the lens system 3 of a third embodiment in which the inclination of the first lens unit 9 with respect to the optical axis x can be set steplessly. Further, FIG. 11 shows the front end of the cam groove 33a, that is, the use portion so as to be enlarged and description will be added.

In the cam ring 6 of the lens system 3 of the image capturing apparatus 1 of the present embodiment, the use positions Pa1, Pb1 and Pc1, the use positions Pa2, Pb2 and Pc2, the use positions Pa3, Pb3 and Pc3 and the use positions Pa4, Pb4 and Pc4 of the cam grooves 33a, 33b and 33c are in the same positional relationship in the direction of the optical axis as the first embodiment.

Figure 11:
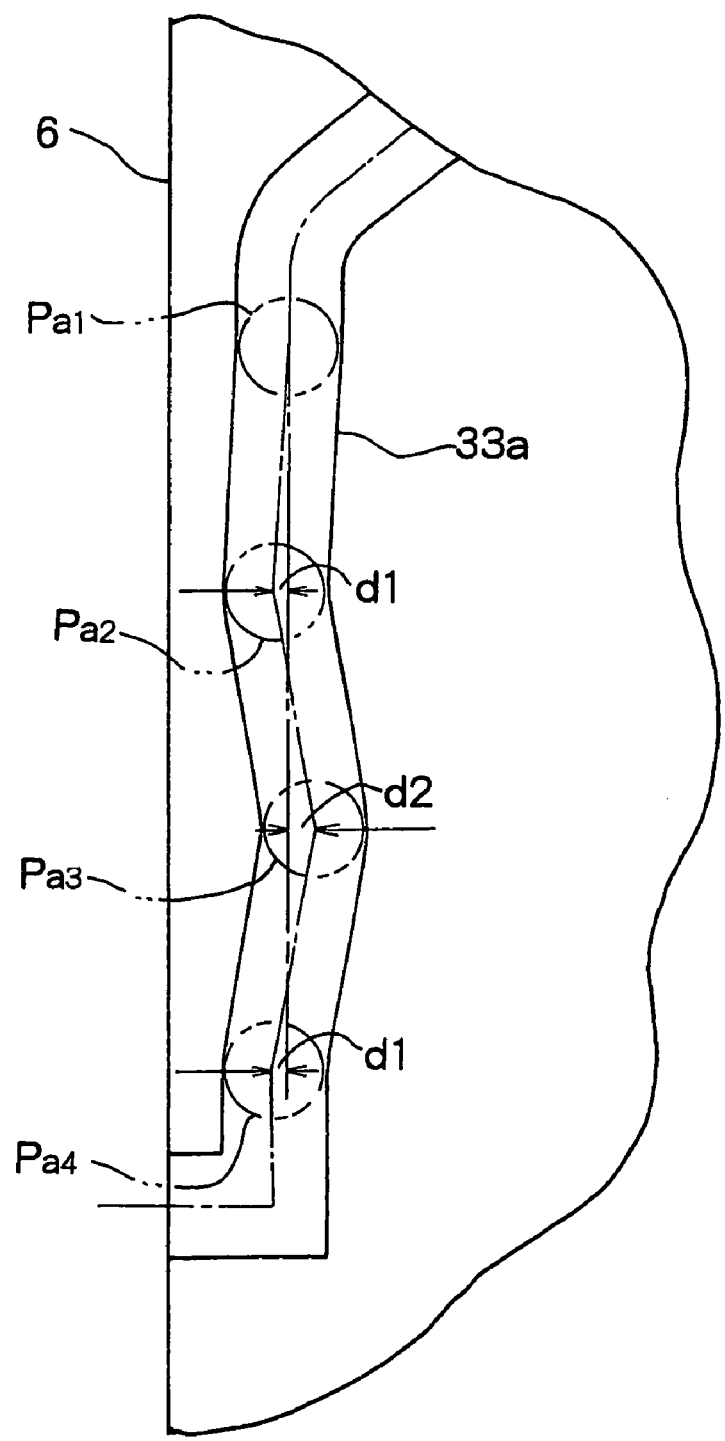
FIG. 11 is a partial enlarged view of a cam groove of FIG. 3.

However, as shown in FIG. 11, in each cam groove 33a, the distances between the use positions Pa1, Pa2, Pa3 and Pa4 are longer than those of the first embodiment, and the cam follower 34a is smoothly moved in the direction of the optical axis x. Consequently, in the lens system 3 of the present embodiment, the inclination of the first lens unit 9 with respect to the optical axis can be set steplessly. The resolution of the rotary encoder 37 is designed to be high and the backlash of the gear train 38 is designed to be small in this embodiment.

Figure 12:
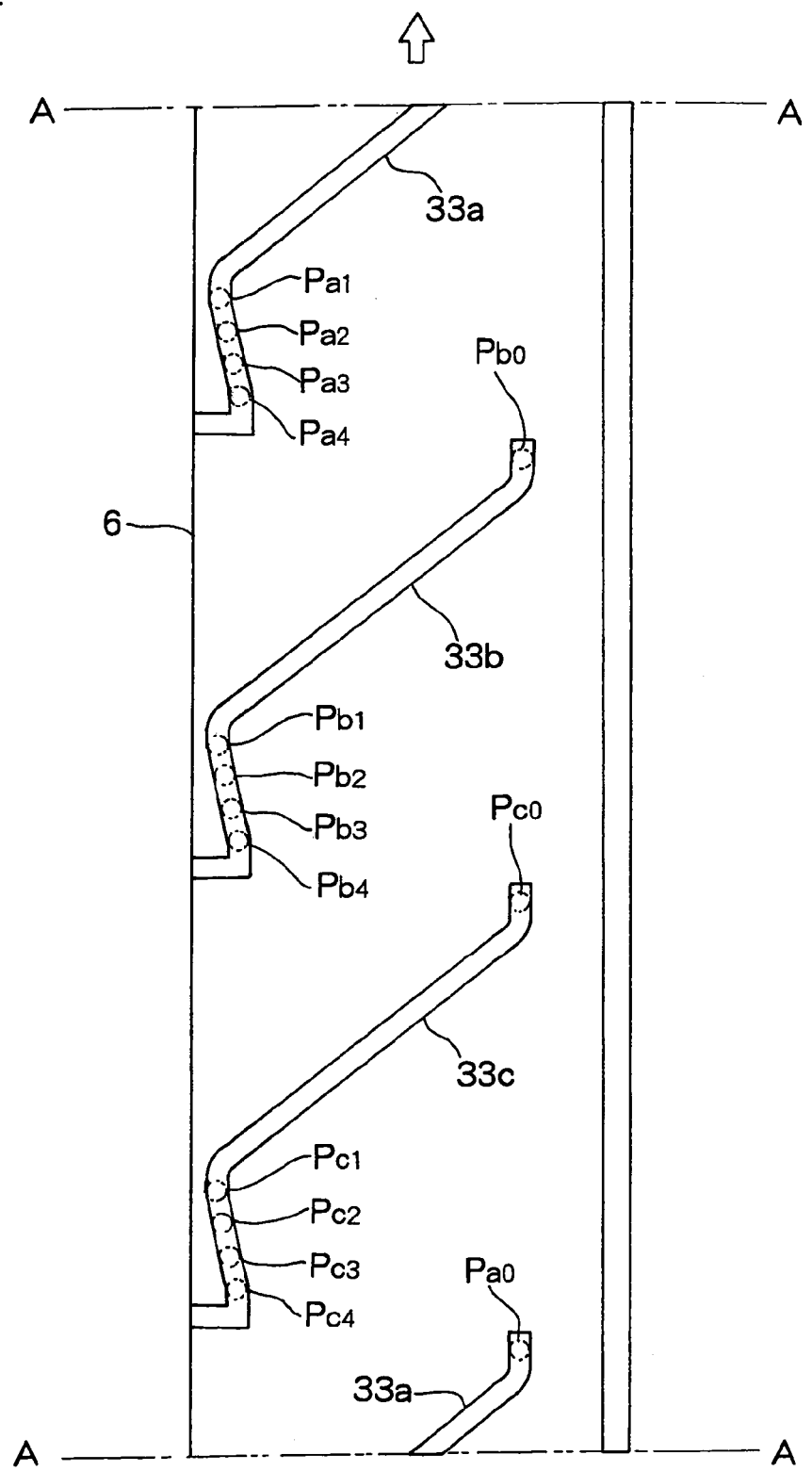
FIG. 12 is a developed view of the cam ring in a fourth embodiment of the present invention.

Further, FIG. 12 shows a developed view of the cam ring 6 of the lens system 3 in the image capturing apparatus 1 of a fourth embodiment. The cam grooves 33a, 33b and 33c of the cam ring 6 of the present embodiment all have the same configuration. In design, the use positions Pa1, Pb1 and Pc1, the use positions Pa2, Pb2 and Pc2, the use positions Pa3, Pb3 and Pc3 and the use positions Pa4, Pb4 and Pc4 are provided so that the axis of the first lens unit 9 coincides with the optical axis x, and the positions in the direction of the optical axis x slightly differ from one another.

For example, the use positions Pa2, Pb2 and Pc2 retract the first lens unit 9 rather than the used positions Pa1, Pb1 and Pc1 without decentering the first lens unit 9. This cancels out the position shifts of the other lens units 12, 14, 18, 21 and 22 in the direction of the optical axis, so that the fixation condition under which a sharp image is formed on the image sensor 23 can be selected.

In the above-described embodiments, the decentering and the position, in the direction of the optical axis, of the first lens unit are adjustable. However, it is to be noted that this is not limited to the first lens unit and the decenterings and the positions, in the direction of the optical axis, of the other lens units may be adjustable. In particular, control is easy when one of the lens units that move between the collapsed condition when the lens system is not used and the moving out condition when the lens system is used and do not move during zooming or during focusing is selected like in the above-described embodiments.

Moreover, the condition changeable lens unit may be a variator lens unit, and by providing a plurality of fixation conditions so that the condition of the inclination decentering, the parallel decentering or the like of the variator lens unit differs in the telephoto end position or wide angle end position or in the close-up position. That is, when the variator lens unit is in a positions frequently used or in a position where a high positional precision is required, a sharp image can be obtained by selecting the condition of the variator lens unit.

As described above, the lens system is provided with a plurality of lens units including a first lens unit and has a condition changing structure that is capable of changing the condition of the first lens unit without changing the position of the first lens unit in the direction of the optical axis.

According to this structure, even when the precision of the part configuration and assembly is low, a sharp image can be obtained by changing the condition of the first lens unit by the condition changing structure to thereby cancel out the decenterings of the other lens units and errors between the lens units. Consequently, a lens system that is high in performance and requires only a short time for designing and manufacturing can be provided inexpensively.

Moreover, the lens system has a first driving mechanism for driving the condition changing structure and a measuring part for measuring the driving amount of the first driving mechanism, and the condition of the first lens unit is determined by the condition changing structure based on the driving amount of the first driving mechanism measured by the measuring part.

According to this structure, the condition of the first lens unit can be set to a condition under which the sharpest image can be obtained as the entire lens unit, based on the driving amount of the first driving mechanism measured by the measuring part.

Moreover, the condition changing structure is capable of decentering the first lens unit by at least either changing the inclination of the first lens unit with respect to the optical axis or parallelly moving the first lens unit in the direction vertical to the optical axis.

According to this structure, a sharp formed image can be obtained by canceling out, particularly, the unfavorable inclination decentering or parallel decentering of the lens unit.

Moreover, the condition changing structure is provided with a cam ring having a plurality of can grooves, the first lens unit is engaged with the plurality of cam grooves and the condition thereof is determined, and at least one of the cam grooves has a different configuration from the other cam grooves.

According to this structure, since the condition of the first lens unit can be determined by the cam mechanism conventionally used for the lens system, a lens system with which a sharp formed image is obtained can be easily realized.

Moreover, a lens unit that is housed when the lens system is not used and protrudes to a fixed position when the lens system is used may be adopted as the first lens unit.

According to this structure, a sharp image can be obtained by changing the condition of the first lens unit by use of a driving mechanism for a so-called collapsed structure to thereby cancel out the decenterings of the other lens units and errors between the lens units. Consequently, since the structure is not complicated, the lens system can be made high in performance without any cost increase.

Moreover, a zooming mechanism may be provided that is capable of changing magnification by moving at least one of the lens units in the direction of the optical axis.

According to this structure, a sharp image can be easily obtained without the need for a high-performance lens system having a magnification changing function to be manufactured so as to be high in precision by putting many hours in designing and manufacturing.

Moreover, the condition changing structure may be operated after the zooming mechanism operates.

According to this structure, by changing the condition of the first lens unit according to the position of the lens unit moved for zooming, even when the relative decentering relationship between the lens units is changed by the performance of zooming, a sharp formed image can be obtained by making the decenterings and errors between the lens units smallest according to the position of the lens unit moved for zooming, as the entire lens unit.

Moreover, the condition changing structure may be operated at the time of activation.

According to this structure, since the decenterings of the lens units and errors between the lens units are made small at the time of activation, a sharp formed image is obtained without any delay when the image capturing apparatus is used.

Moreover, like the description given above, in a lens system provided with a plurality of lens units including a first lens unit, a condition changing structure that is capable of changing the condition of the first lens unit is provided, the optimum condition of the first lens unit under which the sharpest image is obtained is determined after assembly, and the first lens unit is set in the optimum condition by the condition changing structure when the lens system is used.

According to this structure, even if the precision of the part configuration and assembly is low, by changing the condition of the first lens unit by the condition changing structure after assembly, the decenterings of the other lens units and errors between the lens units can be canceled out. Consequently, a sharp image can be obtained even if the time required for designing and manufacturing is short, so that a high-performance lens system can be provided inexpensively.

Moreover, the condition changing structure comprises a cam ring having a plurality of cam grooves, the first lens unit is interlocked with the plurality of cam grooves, and the condition of the first lens unit is determined by the rotation angle of the cam ring.

According to this structure, since the condition of the first lens unit can be determined by the cam mechanism conventionally used for the lens system, a lens system with which a sharp formed image is obtained can be easily realized.

Moreover, an image capturing apparatus having any of the above-described lens systems can be structured.

According to this structure, since an inexpensive lens system can be used under a condition where decentering is small, an image capturing apparatus with which a sharp captured image is obtained can be provided inexpensively.

Moreover, like the description given above, the lens system is provided with a plurality of lens units including a predetermined lens unit, and has a condition changing structure that is capable of changing the condition of the predetermined lens unit without changing the position of the predetermined lens unit in the direction of the optical axis. It is favorable that a lens unit that is not moved for zooming or focusing is selected as the predetermined lens unit because control is easy. Moreover, it is favorable that a lens unit that is collapsed when the lens system not used and is moved out when the lens system is used is selected as the predetermined lens unit, because the condition of the predetermined lens unit can be set when the condition is changed from the collapsed condition to the moving out condition.

By the above-described structure, a lens system and an image capturing apparatus that are inexpensive and with which a sharp formed image is obtained can be provided.

In the above described structures, the zooming or magnification changing can be carried out stepwise or stepless.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A lens system comprising:
   a plurality of lens units including a predetermined lens unit;
   a condition changing structure capable of changing a condition of the predetermined lens unit without changing a position of the predetermined lens unit in a direction along an optical axis of the lens system;
   a first driver for driving the condition changing structure; and
   a measuring part for measuring a driving amount of the first driver, wherein the condition of the predetermined lens unit is determined by the condition changing structure based on the driving amount of the first driver measured by the measuring part.

2. A lens system according to claim 1, wherein the condition changing structure carries out at least one of changing of an inclination of the predetermined lens unit with respect to the optical axis or parallel movement of the predetermined lens unit in a direction perpendicular to the optical axis.

3. A lens system according to claim 1, wherein the condition changing structure comprises a cam ring having a plurality of cam grooves, wherein the predetermined lens unit is interlocked with the plurality of cam grooves and the condition of the predetermined lens unit is determined by a rotation angle of the cam ring.

4. A lens system according to claim 3, wherein at least one of the cam grooves has a different configuration from the other cam grooves.

5. A lens system according to claim 4, wherein an optimum condition of the predetermined lens unit under which a sharpest formed image is obtained is determined after assembly, and the predetermined lens unit is set in the optimum condition by the condition changing structure when used.

6. A lens system according to claim 5 further comprising a storage which memorizes the optimum condition after assembly, wherein the predetermined lens unit is set in the optimum condition by means of the memorized optimum condition.

7. A lens system according to claim 1, wherein the predetermined lens unit is housed when the lens system is not used, and protrudes to a fixed position when the lens system is used.

8. A lens system according to claim 7, wherein the predetermined lens unit is a first lens unit arranged in a frontmost position of the plurality of lens units.

9. A lens system according to claim 7, wherein the condition changing structure operates at the time of activation of the lens system.

10. A lens system according to claim 1 further comprising a magnification changing mechanism by moving at least one of the plurality of lens units along the direction of the optical axis.

11. A lens system according to claim 10, wherein the condition changing structure operates after the magnification changing mechanism operates.

12. A lens system according to claim 11, wherein the condition changing structure operates at the time of activation of the lens system.

13. A lens system comprising:
    a plurality of lens units including a predetermined lens unit;
    a cam ring capable of changing a condition of the predetermined lens unit without changing a position of the predetermined lens unit in a direction along an optical axis of the lens units, the cam ring having a plurality of cam grooves interlocked with the predetermined lens unit, each of the plurality of cam grooves having a moving out portion for projecting the predetermined lens unit to a fixed position and a use portion for changing the condition of the predetermined lens unit, wherein each of the use portions extends in a direction substantially perpendicular to the optical axis at the end of a corresponding one of the moving out portions, wherein the moving out portions have common configurations, and wherein at least one of the use portions has a different configuration from the other use portions;
    a driver for driving the cam ring; and
    a measuring part for measuring a driving amount of the driver,
    wherein the condition of the predetermined lens unit is determined by a rotation angle of the cam ring based on the driving amount of the driver measured by the measuring part, which thereby causes a centering adjustment of the lens unit.

14. A lens system according to claim 13, wherein the cam ring is rotatable, and wherein rotation of the cam ring causes the predetermined lens unit to tilt with respect to the other lens units.

15. A lens system according to claim 13, wherein the cam ring is rotatable, and wherein rotation of the cam ring causes the predetermined lens unit to move in a direction perpendicular to the optical axis.

16. A lens system according to claim 13, wherein each of cam grooves further comprises a housing portion extending in a direction perpendicular to the optical axis at the other end of a corresponding one of the moving out portions, wherein the predetermined lens unit is housed when the lens system is not used.

17. A lens system according to claim 16, wherein the predetermined lens unit is a first lens unit arranged in a frontmost position of the plurality of lens units.

18. A lens system according to claim 13, wherein the predetermined lens unit is a first lens unit arranged in a frontmost position of the plurality of lens units.

* * * * *